(No Model.)  
2 Sheets—Sheet 1.

C. PARKER.
ANIMAL STOCK.

No. 321,999. Patented July 14, 1885.

WITNESSES  
Wm A. Skinkle  
Henry A. Lamb

INVENTOR  
Clawson Parker  
By his Attorneys  
Baldwin, Hopkins & Payton (No Model.) 2 Sheets—Sheet 2.

C. PARKER.
ANIMAL STOCK.

No. 321,999. Patented July 14, 1885.

WITNESSES
Wm A. Skinkle
Henry A. Lamb

INVENTOR
Clawson Parker
By his Attorney
Baldwin, Hopkins & Peyton

UNITED STATES PATENT OFFICE.

CLAWSON PARKER, OF COWLAND, KANSAS.

ANIMAL-STOCK.

SPECIFICATION forming part of Letters Patent No. 321,999, dated July 14, 1885.

Application filed May 2, 1884. (No model.)

*To all whom it may concern:*

Be it known that I, CLAWSON PARKER, of Cowland, Hodgeman county, Kansas, have invented certain new and useful Improvements in Animal-Stocks, of which the following is a specification.

My invention is especially designed to confine animals while being branded; and it consists in a novel organization of apparatus by which the animals may be held under perfect control.

Figure 1:
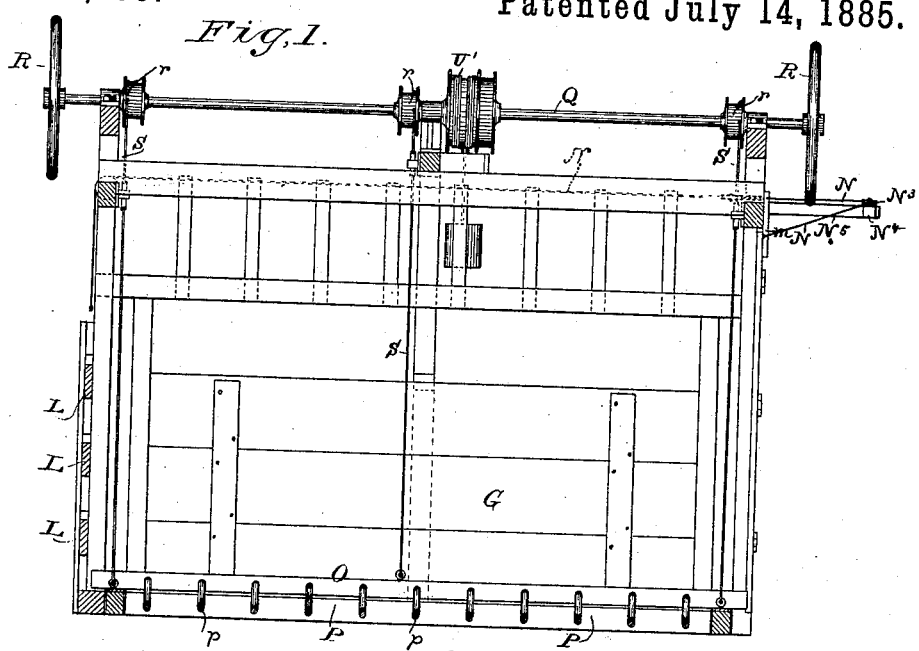
Figure 2:
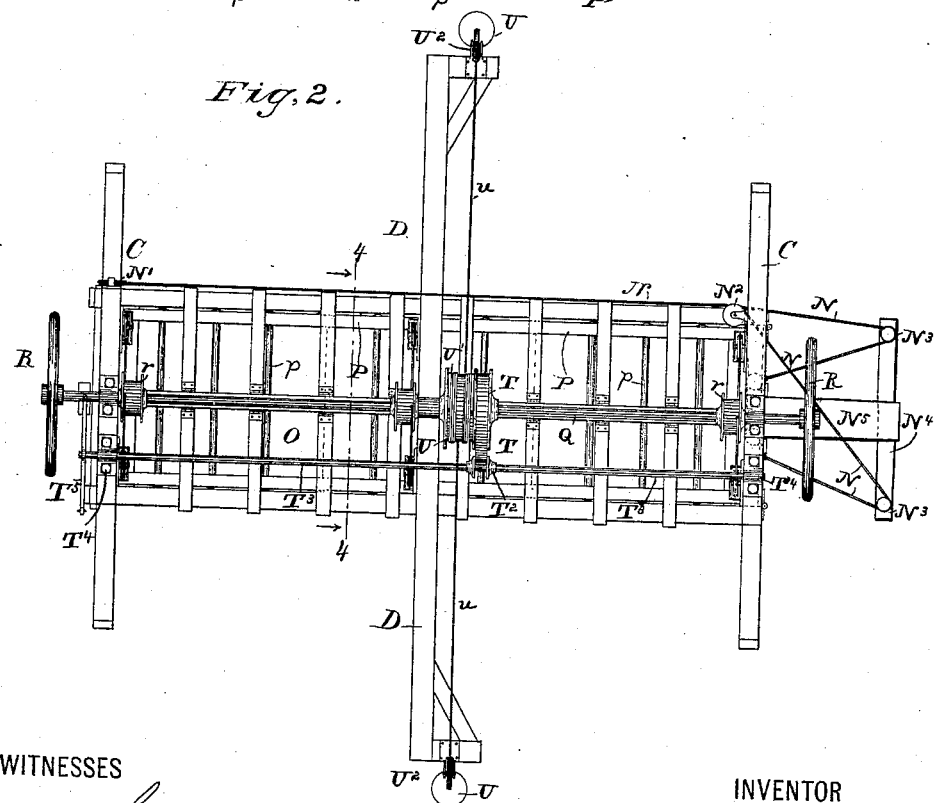
Figure 3:
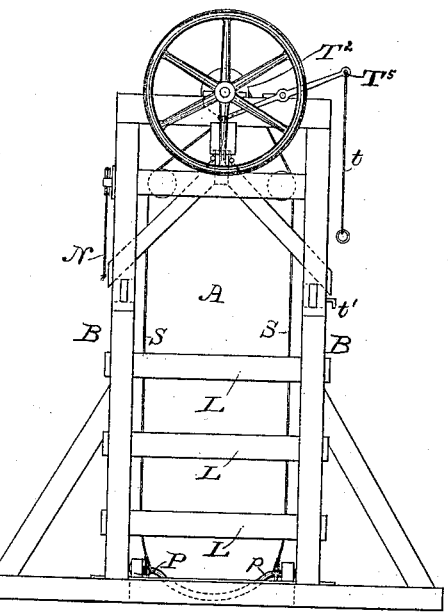
Figure 4:
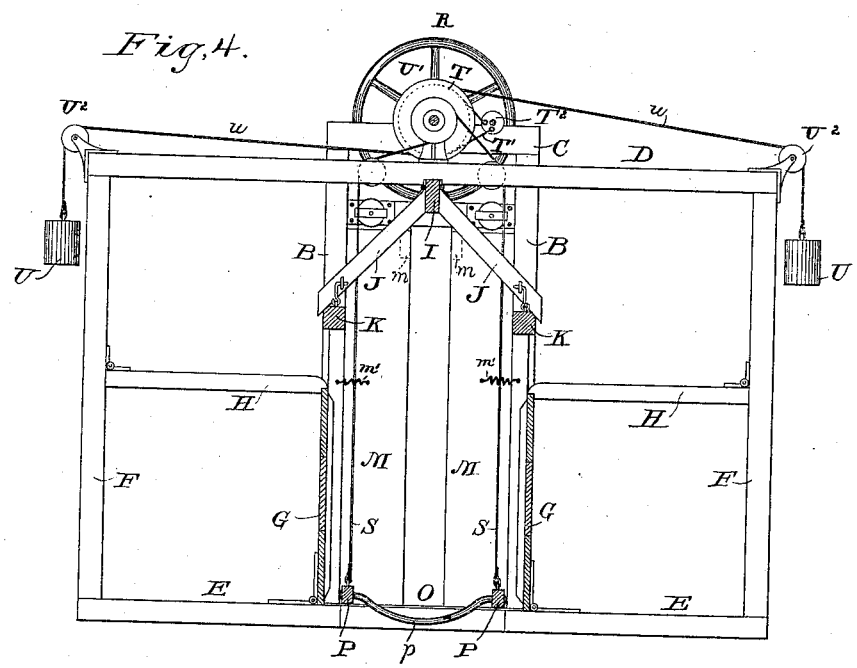

In the accompanying drawings, Figure 1 is a longitudinal central section through my apparatus; Fig. 2, a top view; Fig. 3, an end view of the central portion of the apparatus; and Fig. 4 is a cross-section on the line 4 4 of Fig. 2.

The central frame or chute, A, is constructed of strong timbers, with corner-posts B and cross-bars C. Across the middle of the top of the frame extends a beam, D, that is connected to a base-beam, E, by standards F. The sides G are hinged to the frame, and are normally held in place by bars H, hinged to the standards F. If these bars be raised, the sides may be lowered. A beam, I, extends longitudinally through the chute, and to it are hinged a series of bars, J, that are secured to the side beams, K, by hooks. The bars J rest on the animal's back and hold it steady, so that it cannot twist or turn. The front end of the chute is closed by bars L, that fit into sockets in the frame, as shown in Fig. 3. The rear end of the chute is partially closed by outwardly-swinging doors M M, that are hinged to the frame, and when closed have a central opening between them, as shown in Fig. 4. The doors are prevented from swinging inward too far by stops $m$ on the tops of the doors, which strike against the upper crossbeam. The doors are held normally closed by springs $m'$, attached to the doors and to the main frame, as shown in Fig. 4. A cord, N, leads from the front of the chute over pulleys N' and N² to pulleys N³ on the cross-beam N⁴ of the horizontally-projecting beam N⁵ at the rear end of the chute. The cord is bifurcated at N², each branch passing over a pulley, N³, and being attached to one of the doors M. By simply pulling the cord and holding it the doors may be held open against the force of the springs $m'$. As soon as the cord is released the doors will automatically close.

In the chute A is arranged a crate, O, composed of longitudinal beams P and cross-bars $p$. These bars are preferably curved, as shown, to conform somewhat to the animal's body, and are placed at intervals apart, so that the legs of the animal extend through the crate, and the animal may be branded on the under part of its body, if desired.

On the top of the frame, in suitable bearings, is mounted a shaft, Q, carrying one or more hand-wheels, R, and two or more drums, $r$. Ropes or chains S lead from the drums to the crate, and when the shaft is revolved the crate is elevated. The shaft may be locked in any desired position by a brake or other suitable device. I have shown in the drawings a friction-brake consisting of a pulley, T, secured rigidly to the shaft Q, over which extends a strap, T', the ends of which are secured to an eccentric, T², on the shaft T³. The shaft T³ is journaled in bearings T⁴ at each end of the frame, and a lever, T⁵, is secured to the shaft at its forward end. The brake is operated by a cord, $t$, that may be held down by a hook, $t'$. It is obvious that when the lever is depressed the shaft T³ will be turned and the strap tightened, thus preventing the shaft Q from revolving. When the shaft Q is free—that is, not held by the brake—it will be caused to turn and raise the crate by means of weights U, attached to cords $u$, that are wound on a pulley, U', and extend over pulleys U².

The animal to be branded or otherwise treated is driven into the chute, (the crate being lowered, the shaft locked, and the doors closed,) and the bars L are put in place. If the friction-brake be loosed, the crate will be automatically raised by the weights, the animal still being on its feet. If, now, the shaft be turned, the animal will be lifted up bodily until its back touches the bars J, and will be in a perfectly helpless condition, and may be dealt with as desired. When the crate is elevated, the shaft may be locked by the brake. If it is desired to get under the animal, the sides may be lowered. The bars J being hinged, access may be had to any part of the animal's back or side. When the branding, &c., is completed, the brake may be removed, the crate lowered, the doors opened, and the animal allowed to escape.

I claim as my invention—

1. The combination, substantially as set forth, of the chute, the crate through which the animal's legs project, the weights that raise the crate to the animal's body, and the windlass for elevating the crate.

2. The combination, substantially as set forth, of the chute, the crate, the weights that raise the crate to the animal's body, the windlass for elevating the crate, and the brake for locking the windlass.

3. The combination, substantially as set forth, of the chute, the front bars, the normally-closed rear doors, and the cords for holding the doors open.

4. The combination, substantially as set forth, of the chute and the hinged bars arranged in the top of the chute, that rest on the animal's back.

5. The combination, substantially as set forth, of the chute, the hinged sides, the uprights F, and the beams H, hinged to the uprights, that normally hold the sides closed.

In testimony whereof I have hereunto subscribed my name.

CLAWSON PARKER.

Witnesses:
BERT WILLIAMS,
SAMUEL P. WOOD.